United States Patent [19]

Kato et al.

[11] Patent Number: 4,854,681

[45] Date of Patent: Aug. 8, 1989

[54] COMPACT ZOOM LENS

[75] Inventors: Masatake Kato; Sadahiko Tsuji; Muneharu Sugiura; Kazuo Tanaka, all of Tokyo, Japan

[73] Assignee: Canon Kabushiki Kaisha, Tokyo, Japan

[21] Appl. No.: 931,537

[22] Filed: Nov. 14, 1986

[30] Foreign Application Priority Data

Nov. 25, 1985 [JP] Japan .................. 60-264372

[51] Int. Cl.$^4$ .................. G02B 9/64; G02B 15/14
[52] U.S. Cl. .................................................. 350/427
[58] Field of Search ........................................ 350/427

[56] References Cited

U.S. PATENT DOCUMENTS 4,439,017 3/1984 Yamaguchi .................. 350/427
4,666,257 5/1987 Tanaka et al. .................. 350/427

Primary Examiner—Bruce Y. Arnold
Assistant Examiner—Rebecca D. Gass
Attorney, Agent, or Firm—Fitzpatrick, Cella, Harper & Scinto

[57] ABSTRACT

A compact zoom lens comprising, from front to rear, a first lens unit of positive power for focusing, a second lens unit of negative power axially movable in one direction when zooming from one end of a range of image magnification to the other, a third lens unit of positive power axially movable in a path convex toward the rear to maintain the constant position of an image surface which shifts with zooming, and a fourth lens unit of positive power for forming an image which remains stationary during zooming, wherein a fixed diaphragm is arranged in a space between the second and third lens units.

13 Claims, 7 Drawing Sheets

COMPACT ZOOM LENS

BACKGROUND OF THE INVENTION

1. Field of the Invention

This invention relates to compact lenses, and more particularly to high-range compact zoom lenses suited for photographic cameras or video cameras. Still more particularly, it relates to the reduction of the weight of the entire lens system.

2. Description of the Related Art

The conventional zoom lenses of relatively high range which have found their use in photographic film cameras and video cameras are of the form shown in FIG. 1, where a first lens unit 11 of positive power for focusing, a second lens unit 12 of negative power axially movable in one direction mainly to vary the image magnification from one limit of a range to the other, a third lens unit 13 of negative power axially movable in reciprocating paths convex toward the front to compensate for the image shift resulting from the change of the image magnification, a fixed fourth lens unit 14 of positive power for making afocal the light beam leaving the third lens unit 13, which is not always necessary to use, and a fixed fifth lens unit 15 of positive power having an image forming function are arranged in this order from the front. A diaphragm 16 is, in most cases, positioned in between the third and fourth lens units 13 and 14, or between the fourth and fifth lens units 14 and 15. In the zoom lens of FIG. 1, the second and third lens units 12 and 13 have a common space for zooming movement. Its physical length is, therefore, by nature relatively short. To achieve a further reduction of the size of the entire lens system in the longitudinal and lateral directions, the refractive power of the second lens unit 12 has to be as strong as possible in respect of a reduction of the total zooming movement of the second lens unit 12. The increase in power of the second lens unit 12, however, tends to increase the difficulty of effecting the aberration correction against its zooming movement. There is another problem that the tolerances of the design parameters must be made more rigorous. Besides these, according to the long investigation by the present inventor, it has been found that, in some cases, too much increase in refractive power of the second lens unit 12 calls for an unduly large increase of the axial thickness of the convex lens element to make sure the minimum acceptable edge thickness of the convex lens element is retained. As a result, the physical length of the entire system is contradictorily caused to elongate. Therefore, it is impossible to rely on the method of strengthening the power of the second lens unit 12 to any great extent.

Also, to increase the angular field in the wide angle setting by decreasing the shortest focal length, the diameter of the first lens unit 11 must be increased, because it is determined by the oblique pencil to be transmitted to the extra-axial image point. Hence, the wider the maximum angular field, the larger the diameter of the first lens unit, making the entire lens system more bulky. If the shortest focal length is shifted to the longer side, on the other hand, then because the diameter of the first lens unit 11 is determined by which of, the oblique pencil near or at the wide angle setting and the axial pencil at the telephoto setting has a larger maximum diameter, the longest focal length becomes too long to obtain the prescribed value of the zoom ratio. This is reflected to an increase of the diameter. Another feature of the zoom lens of FIG. 1 is that the second and third lens units 12 and 13 both are negative in power with the axial beam diverging in passing therethrough. Therefore, the aperture diameter of the diaphragm which takes its place behind them tends to increase. The zoom lenses of longer focal lengths generally have larger aperture diameters. Also, the required diameter for the diaphragm unit is usually about 2 times the maximum aperture diameter. Accordingly, it is not desirable to employ the type of FIG. 1 in designing a zoom lens whose longest focal length is too long, when the chief aim is made to achieve an improvement of the compact form of the zoom lens.

It is also known to provide another type of zoom lens shown in FIG. 2 comprising a first lens unit 21 of positive power for focusing, a second lens unit 22 of negative power axially movable in one direction to vary the image magnification from one end of a range to the other, a third lens unit 23 of positive power axially movable in reciprocating paths which, when expanded, follows a locus convex toward the rear to compensate for the image shift resulting from the change of the image magnification, and a fourth lens unit 24 of positive power for forming an image of an object, wherein the diaphragm 25 is positioned in a space between the third and fourth lens units 23 and 24. The use of this type allows for the possibility of making smaller the aperture diameter than that of the former type shown in FIG. 1. But, because the zoom lens units 22 and 23 have no common space for movement, the size of the entire lens system becomes longer in the longitudinal direction. Also, because the distance from the first lens unit 21 to the diaphragm 25 is necessarily increased, the diameter of the first lens unit 21 which is determined by the oblique pencil for the extra-axial image point near or at the wide angle setting tends to increase.

As the related art, mention may be made of a zoom lens having a fixed diaphragm in between the second and third lens units as disclosed in U.S. patent application Ser. No. 877,101 filed June 23, 1986, now U.S. Pat. No. 4,763,998 and assigned to the assignee of the present invention.

SUMMARY OF THE INVENTION

An object of the present invention is to provide a zoom lens of greatly extended range while still permitting the physical length of the entire lens system and the diameter of the first lens unit to be reduced simultaneously, thus achieving a great reduction of the weight of the entire lens system as suited for use particularly with cameras using photographic film, or video cameras.

BRIEF DESCRIPTION OF THE DRAWINGS

FIGS. 7A, 7B and 7C to FIGS. 9A, 9B and 9C are graphic representations of the various aberrations of the lenses o FIGS. 4 to 6 respectively.

DETAILED DESCRIPTION OF THE PREFERRED EMBODIMENTS

Figure 3:
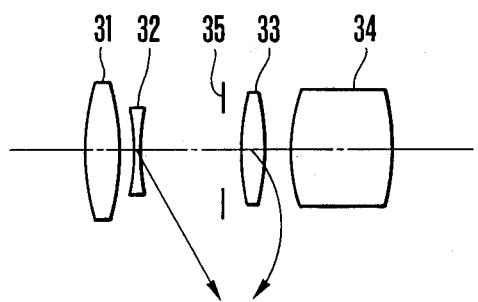
FIG. 3 is a schematic block diagram of the diaphragm arrangement of a general embodiment of the zoom lens according to the present invention.
Figure 4:
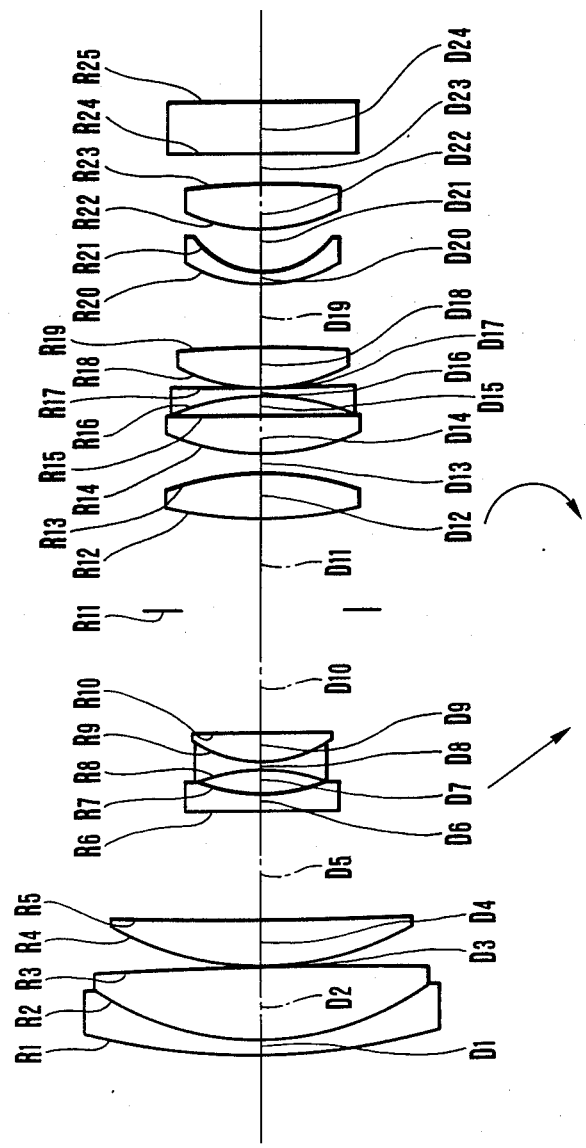
FIGS. 4 to 6 are longitudinal section views of three examples of specific zoom lenses of the invention respectively.
Figure 5:
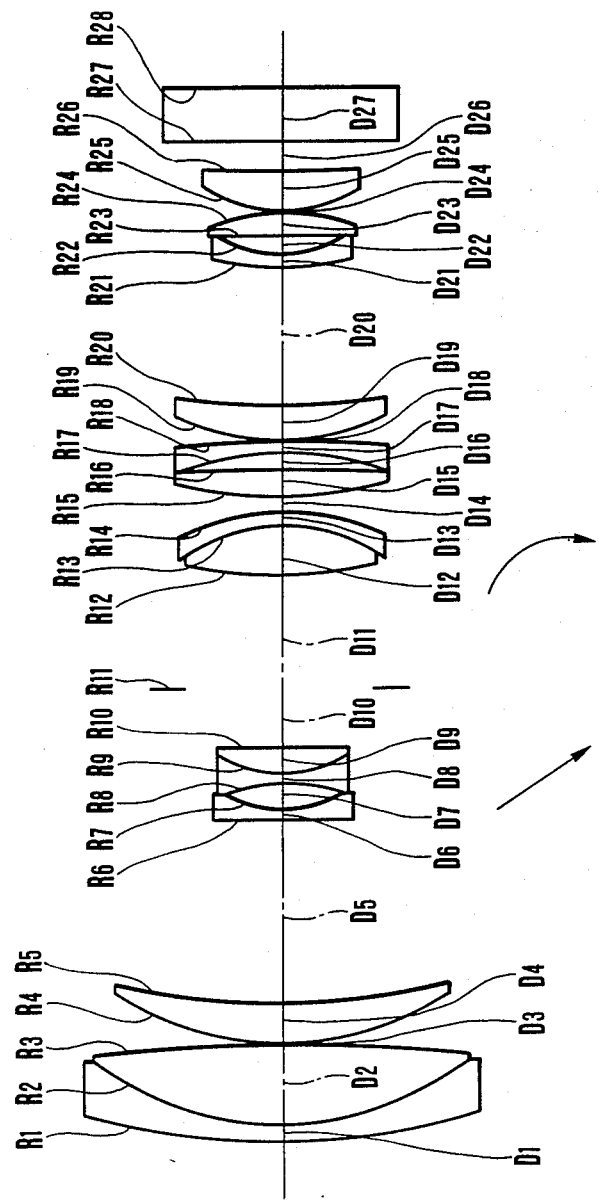
Figure 6:
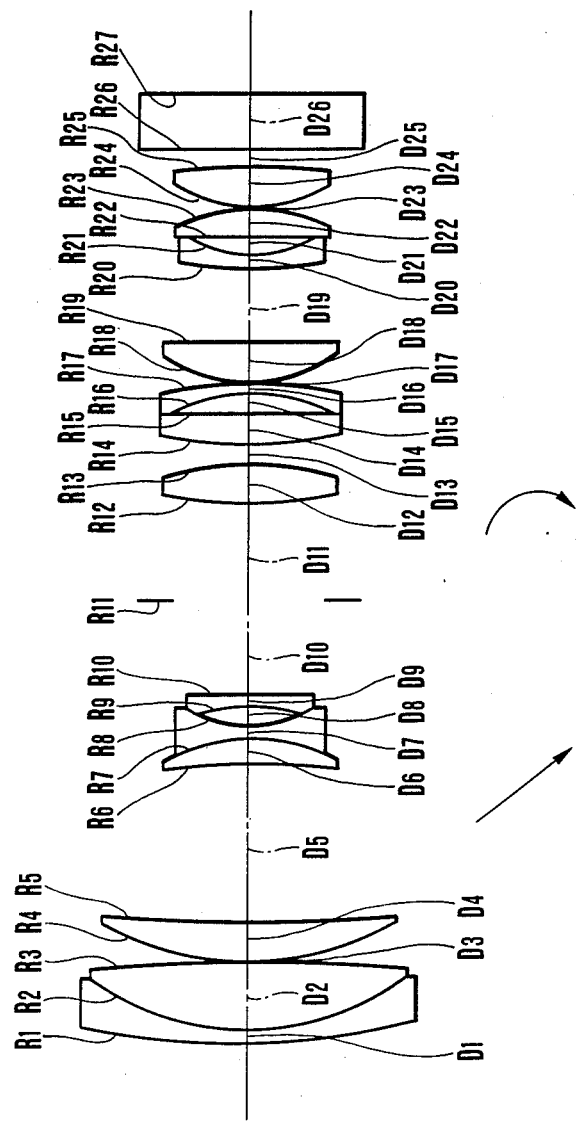
Figure 7A:
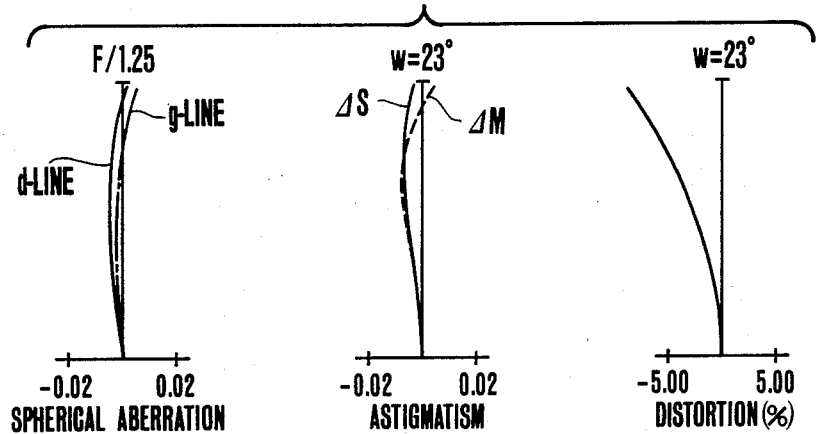
Figure 7B:
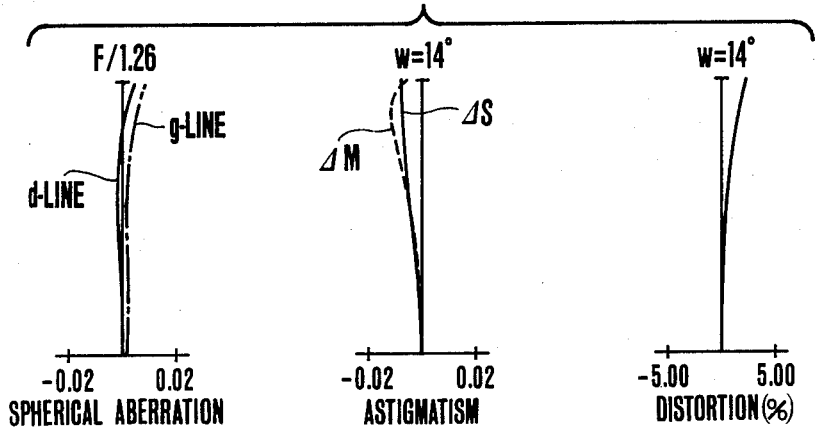
Figure 7C:
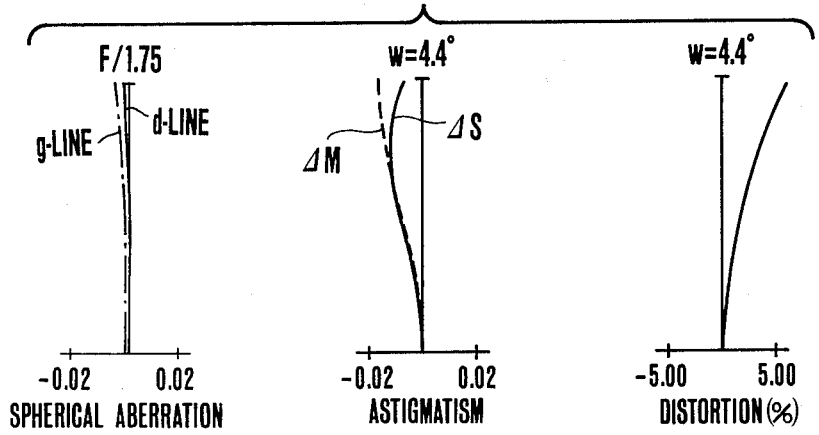
Figure 8A:
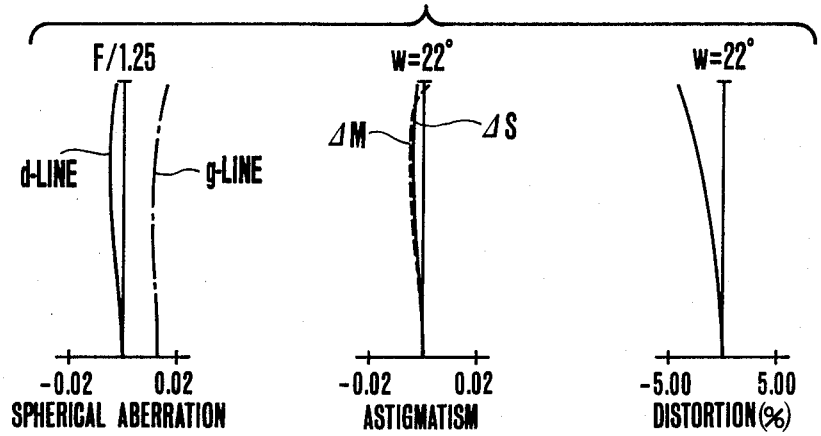
Figure 8B:
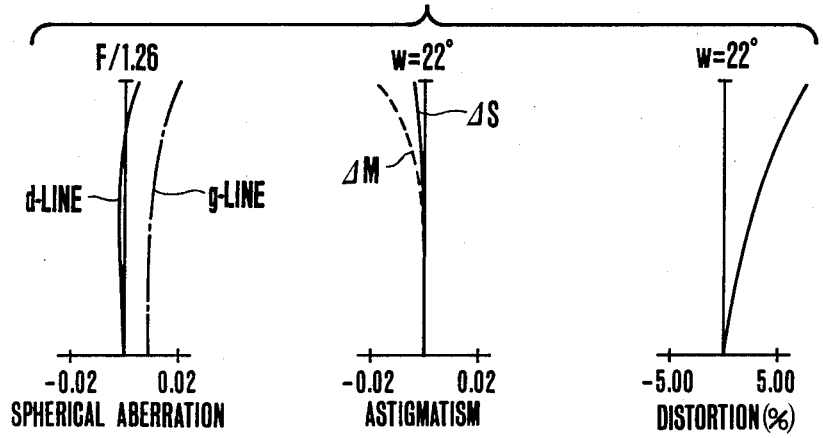
Figure 8C:
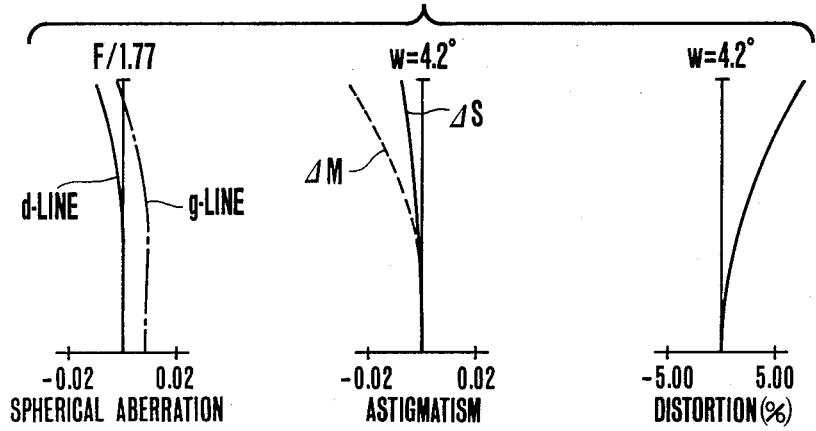
Figure 9A:
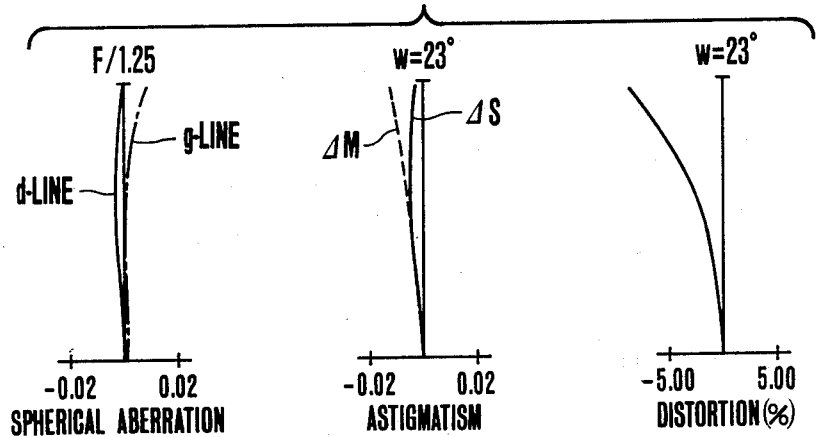
Figure 9B:
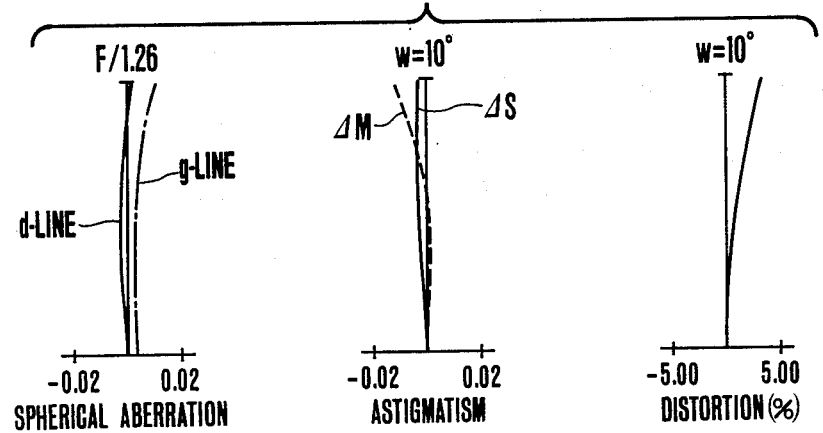
Figure 9C:
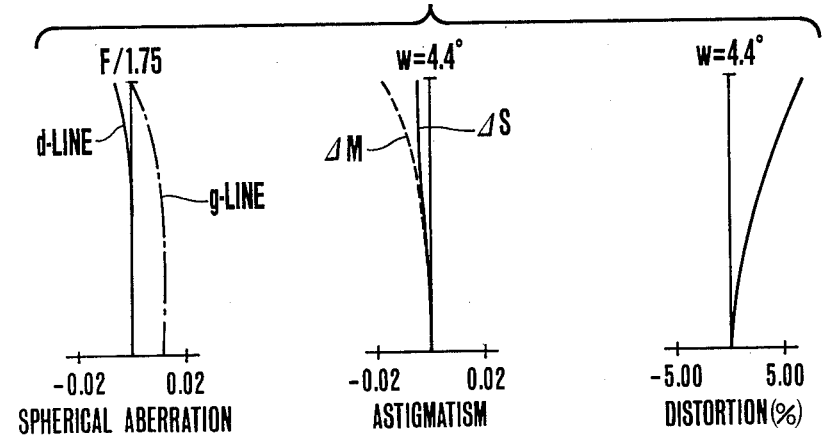

In FIG. 3 there is shown the optical system of an embodiment of the invention. For the purpose of convenience, one lens unit is depicted as one lens. The zoom lens of FIG. 3 comprises, from front to rear, a first lens unit 31 of positive power for focusing, a second lens unit 32 of negative power axially movable in one direction, for example, rearward when varying the focal length from the shortest to the longest value, a third lens unit 33 of positive power axially movable reciprocatingly in a convex locus toward the rear, or first rearward and then forward when varying the focal length from one limit of the range to the other, and a fourth lens unit 34 of positive power which functions to form an image of an object. A diaphragm 35 is fixedly positioned in between the second and third lens units 32 and 33 to determine F-numbers.

In general, for the zoom lens of the type shown in FIG. 3, even if the diaphragm is arranged in between the second and third lens units 32 and 33 to be stationary during zooming, the use of the zoom type in which the third lens unit 33 when zoomed follows another, concave locus toward the rear, leads to increase the physical length of the entire system, because the fixed diaphragm deprives this zoom type of the advantage for the second and third lens units to have a common space for movement. That is, for the concave motion of the third lens unit toward the rear, because a space must be created between the diaphragm and the third lens unit in the terminal end of zooming movement to allow for the nearest approach of the third lens unit toward the diaphragm without causing mechanical interference therebetween in the middle zooming position, the physical length of the entire lens system is increased by the axial length of that space.

In the embodiment of the invention, on the other hand, although the fixed diaphragm 35 lies in between the second and third lens units 32 and 33, the adoption of a different zoom type in which the second and third lens units are moved in such a way as not to interfere with the diaphragm 35 as has been described above has removed the necessity of introducing such a surplus air space. This provides a possibility of reducing the physical length of the entire lens system.

Another feature of the conventional zoom lenses of the general type is that, in most of them, the first lens unit accounts for 50 to 80% of the weight of the entire lens system. From this point of view, an effective method of reducing the weight of the zoom lens is either by selecting materials of lower specific gravity for employment in the lens elements of the first lens unit, or by reducing the diameter of the first lens unit. Of these, the use of the materials of lower specific gravity will diminish the flexibility of lens design. For this reason, in order to achieve a remarkable reduction of the weight of the zoom lens with the preservation of high grade imagery, it is advantageous to adopt the latter method. On assumption that the diameter and thickness of a lens vary at the same rate, the weight of the lens is proportional to the cube of its diameter. If the diameter can be reduced by, for example, 10%, it is, therefore, to be understood from $(0.9)^3$ that the weight becomes about 27% lighter.

In the embodiment of the invention, priority is given particularly to a reduction of the diameter of the first lens unit, when a zoom lens of light weight is realized. That is, compared with the zoom lenses of FIGS. 1 and 2 where the diaphragm lies behind the fourth or third lens unit, the zoom lens of the invention has its diaphragm brought forward ahead the third lens unit 33. As a result, the diaphragm 35 takes its place at almost the center of the overall length of the entire lens system. This feature facilitates a minimization of the diameter of the first lens unit. To achieve a further reduction of the diameter of the first lens unit, the diaphragm and the lens units are so arranged that the value of the diameter which is determined by the oblique pencil on the wide angle side and that value of the diameter which is determined by the axial pencil on the telephoto side are both minimized. In other words, the requirement of preventing the effective diameter of the first lens unit from being increased when it admits increasingly large oblique pencils as the maximum angular field is increased is balanced with the requirement of taking the diameter of the first lens unit at a desired value by regulating the f-number at full aperture on the telephoto side under the condition that the diameter of the first lens unit is partly determined by the axial pencil on the telephoto side. Thus, the longitudinal and lateral lengths of the entire lens system are controlled to a good balance.

Another feature of the invention is that the positive power of the third lens unit 33 is so adjusted that the axial beam travelling to the fourth lens unit 34 becomes almost afocal or convergent. This produces an advantage that the effective diameter of the fourth lens unit is minimized.

Figure 1:
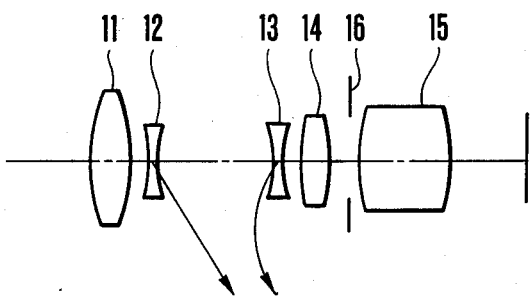
FIGS. 1 and 2 are schematic block diagrams of two types of optics of the conventional zoom lenses.
Figure 2:
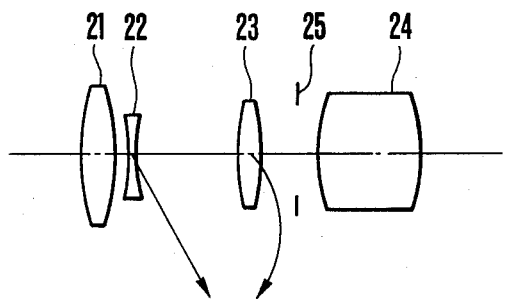

The choice of the nearly afocal axial beam is rather preferred on account of achievement of a simplification of the lens structure as that part of the lens system which is equivalent to the fourth lens unit 14 of FIG. 1 can be omitted. Further since the refractive power of the third lens unit 33 is weaker than that when axial beam is convergent, the third lens unit 33 may be constructed with a fewer number of lens elements, or a singlet or a doublet alone.

In a specific embodiment of the invention, the aim of achieving a valuable reduction of the bulk and size of the entire lens system despite the diaphragm 35 lying in a space between the second and third lens units 32 and 33 is fixed in axial position and these lens units are moved to vary the focal length over the high range without causing mechanical interference with the fixed diaphragm 35 is set forth by the following relationship:

$$0.75 < ls/lt < 0.98$$

where ls and lt are respectively the axial air separations between the first lens unit 31 and the diaphragm 35 and between the first lens unit 31 and the third lens unit 33 in the telephoto position with an object at infinity.

As, in the invention, the second and third lens units 32 and 33 are made to move on either side of the fixed diaphragm 35 to vary the focal length of the entire system, when the upper limit of inequalities of condition stated above is exceeded, the possibility of occurrence of mechanical interference between the third lens unit 33 and the diaphragm 35 is rapidly increased. When the lower limit is exceeded, the distance from the diaphragm 35 to the third lens unit 33 becomes too long. This causes the variable separations between the second and third lens units 32 and 33 to increase with the result that when in the telephoto position, the marginal rays of the axial or oblique pencil leaving the second lens unit 32 of diverging action to enter the third lens unit 33 at increased heights from the optical axis. Therefore, the effective diameter of the third lens unit 33 must be increased objectionably.

This type of zoom lens is, by nature, characterized in that the spherical aberration and longitudinal chromatic aberration produced from the third lens unit 33 scarcely varies with zooming. Therefore, it also becomes possible to construct the third lens unit 33 in the form of a singlet, and if the third lens unit 33 takes almost the same position for the shortest and longest focal lengths, it will contribute to almost the same amounts of all aberrations in the wide angle and telephoto positions. Because the total zooming movement of the third lens unit 33 is limited to a minimum, the range of variation of all aberrations across the middle focal length position can be minimized.

Further, the choice of the nearly afocal axial beam in emerging from the third lens unit 33, as has been stated above, removes the necessity of making a tracking adjustment which would otherwise be done by using an additional fixed lens unit such as that indicated at 14 in FIG. 1 as in the prior art, while spoiling all efforts to minimize the total necessary number of lens elements constituting the complete zoom lens.

In the zoom type in which the front and rear lens units between which the diaphragm unit is disposed are moved to effect zooming, if the conventional cam is formed on the tube of the lens mounting, the tube must be of large diameter. In the embodiment of the invention, therefore, the cam is formed on a ring, so that it can be arranged in front or in rear of the diaphragm. Another method is to use a plate cam arranged on the side of the diaphragm unit.

Also, among many drive connections from the zoom actuator to the linear cam for the second lens unit there is the bar type. For this case, if it is merely arranged outside the diaphragm unit, the diameter of the outer barrel of the lens mounting is disadvantageously increased. From this reason, the diaphragm unit itself is modified from the round iris form to another one, for example, a slide form with the use of two blades arranged to slidingly move in the lateral directions in combination with the bar arranged to move vertically in a space formed between the two blades. Thus, the diaphragm of such construction is compatible with a mounting mechanism of simplified structure and minimized size.

Three examples of specific zoom lenses of the invention can be constructed in accordance with the numerical data given in the following tables for the radii of curvature, R, the axial thicknesses or separations, D, and the refractive indices, N, and Abbe numbers, $\nu$, of the glasses of the lens elements with the subscripts numbered consecutively from front to rear. In these tables, I, II, III and IV represent the first, second, third and fourth lens units respectively having focal lengths f1, f2, f3 and f4.

| Numerical Example 1 | | | | |
|---|---|---|---|---|
| | F = 1.00–5.53 | FNO = 1:1.25–1.75 | $2\omega$ = 46.1°–8.8° | |
| I | R1 = 6.956 | D1 = 0.170 | N1 = 1.80518 | $\nu$1 = 25.4 |
| | R2 = 3.245 | D2 = 0.851 | N2 = 1.60311 | $\nu$2 = 60.7 |
| | R3 = −31.949 | D3 = 0.016 | | |
| | R4 = 3.867 | D4 = 0.446 | N3 = 1.69680 | $\nu$3 = 55.5 |
| | R5 = 29.817 | D5 = Variable | | |
| II | R6 = −48.470 | D6 = 0.106 | N4 = 1.77250 | $\nu$4 = 49.6 |
| | R7 = 1.593 | D7 = 0.329 | | |
| | R8 = −1.856 | D8 = 0.106 | N5 = 1.69680 | $\nu$5 = 55.5 |
| | R9 = 1.538 | D9 = 0.276 | N6 = 1.84666 | $\nu$6 = 23.9 |
| | R10 = 15.081 | D10 = Variable | | |
| | R11 = Aperture Stop | D11 = Variable | | |
| III | R12 = 5.602 | D12 = 0.478 | N7 = 1.51633 | $\nu$7 = 64.1 |
| | R13 = −3.808 | D13 = Variable | | |
| IV | R14 = 2.912 | D14 = 0.425 | N8 = 1.74320 | $\nu$8 = 49.3 |
| | R15 = −19.940 | D15 = 0.177 | | |
| | R16 = −3.039 | D16 = 0.106 | N9 = 1.84666 | $\nu$9 = 23.9 |
| | R17 = 15.491 | D17 = 0.016 | | |
| | R18 = 2.443 | D18 = 0.446 | N10 = 1.69680 | $\nu$10 = 55.5 |
| | R19 = −15.046 | D19 = 0.687 | | |
| | R20 = 1.649 | D20 = 0.117 | N11 = 1.80518 | $\nu$11 = 25.4 |
| | R21 = 0.967 | D21 = 0.463 | | |
| | R22 = 1.542 | D22 = 0.531 | N12 = 1.77250 | $\nu$12 = 49.6 |
| | R23 = −9.172 | D23 = 0.319 | | |
| | R24 = ∞ | D24 = 0.585 | N13 = 1.51633 | $\nu$13 = 64.1 |
| | R25 = ∞ | | | |

| F | 1. | 1.713 | 5.53 |
|---|---|---|---|
| D5 | 0.190 | 1.254 | 2.231 |
| D10 | 2.430 | 1.366 | 0.390 |
| D11 | 0.339 | 1.040 | 0.126 |
| D13 | 0.936 | 0.235 | 1.149 | f1 = 4.460
f2 = −1.117
f3 = 4.468
f4 = 2.455

$\frac{l_S}{l_T} = 0.965$

Numerical Example 2

F = 1.00–5.51  FNO = 1:1.25–1.77  2ω = 44.4°–8.5°

| | | | | |
|---|---|---|---|---|
| I | R1 = 10.069 | D1 = 0.163 | N1 = 1.80518 | ν1 = 25.4 |
| | R2 = 3.532 | D2 = 0.867 | N2 = 1.69680 | ν2 = 55.5 |
| | R3 = −13.514 | D3 = 0.015 | | |
| | R4 = 3.633 | D4 = 0.387 | N3 = 1.69680 | ν3 = 55.5 |
| | R5 = 9.107 | D5 = Variable | | |
| II | R6 = −31.107 | D6 = 0.102 | N4 = 1.77250 | ν4 = 49.6 |
| | R7 = 1.405 | D7 = 0.265 | | |
| | R8 = −1.790 | D8 = 0.102 | N5 = 1.69680 | ν5 = 55.5 |
| | R9 = 1.371 | D9 = 0.265 | N6 = 1.84666 | ν6 = 23.9 |
| | R10 = 29.752 | D10 = Variable | | |
| | R11 = Aperture Stop | D11 = Variable | | |
| III | R12 = 5.942 | D12 = 0.561 | N7 = 1.51633 | ν7 = 64.1 |
| | R13 = −1.765 | D13 = 0.102 | N8 = 1.69895 | ν8 = 30.1 |
| | R14 = −2.745 | D14 = Variable | | |
| | R15 = 5.090 | D15 = 0.306 | N9 = 1.74400 | ν9 = 44.7 |
| | R16 = −14.084 | D16 = 0.174 | | |
| | R17 = −3.224 | D17 = 0.102 | N10 = 1.84666 | ν10 = 23.9 |
| | R18 = −20.145 | D18 = 0.015 | | |
| | R19 = 2.467 | D19 = 0.398 | N11 = 1.69680 | ν11 = 55.5 |
| IV | R20 = 10.575 | D20 = 1.476 | | |
| | R21 = 4.184 | D21 = 0.112 | N12 = 1.80518 | ν12 = 25.4 |
| | R22 = 1.381 | D22 = 0.184 | | |
| | R23 = 41.308 | D23 = 0.255 | N13 = 1.51633 | ν13 = 64.1 |
| | R24 = −2.295 | D24 = 0.015 | | |
| | R25 = 1.387 | D25 = 0.428 | N14 = 1.72000 | ν14 = 50.2 |
| | R26 = 10.404 | D26 = 0.306 | | |
| | R27 = ∞ | D27 = 0.561 | N15 = 1.51633 | ν15 = 64.1 |
| | R28 = ∞ | | | |

| F | 1. | 2.74 | 5.506 |
|---|---|---|---|
| D5 | 0.115 | 1.951 | 2.446 |
| D10 | 2.466 | 0.629 | 0.134 |
| D11 | 0.129 | 1.241 | 0.618 |
| D14 | 1.275 | 0.163 | 1.787 | f1 = 4.635
f2 = −1.071  $\frac{l_S}{l_T} = 0.844$
f3 = 4.285
f4 = 2.618

Numerical Example 3

F = 1.00–5.52  FNO = 1:1.25–1.75  2ω = 46.1°–8.8°

| | | | | |
|---|---|---|---|---|
| I | R1 = 9.490 | D1 = 0.170 | N1 = 1.80518 | ν1 = 25.4 |
| | R2 = 3.589 | D2 = 0.691 | N2 = 1.62299 | ν2 = 58.2 |
| | R3 = −24.626 | D3 = 0.016 | | |
| | R4 = 3.999 | D4 = 0.425 | N3 = 1.69680 | ν3 = 55.5 |
| | R5 = 32.462 | D5 = Variable | | |
| II | R6 = −11.112 | D6 = 0.302 | N4 = 1.84666 | ν4 = 23.9 |
| | R7 = −1.920 | D7 = 0.106 | N5 = 1.60311 | ν5 = 60.7 |
| | R8 = 1.616 | D8 = 0.236 | | |
| | R9 = −1.678 | D9 = 0.106 | N6 = 1.77250 | ν6 = 49.6 |
| | R10 = 28.879 | D10 = Variable | | |
| | R11 = Aperture Stop | D11 = Variable | | |
| III | R12 = 6.278 | D12 = 0.425 | N7 = 1.51633 | ν7 = 64.1 |
| | R13 = −3.678 | D13 = Variable | | |
| | R14 = 5.954 | D14 = 0.319 | N8 = 1.74400 | ν8 = 44.7 |
| | R15 = −42.698 | D15 = 0.221 | | |
| | R16 = −2.175 | D16 = 0.106 | N9 = 1.84666 | ν9 = 23.9 |
| | R17 = −4.689 | D17 = 0.016 | | |
| | R18 = 2.145 | D18 = 0.414 | N10 = 1.69680 | ν10 = 55.5 |
| | R19 = 23.270 | D19 = 0.790 | | |
| IV | R20 = 4.876 | D20 = 0.117 | N11 = 1.80518 | ν11 = 25.4 |
| | R21 = 1.345 | D21 = 0.237 | | |
| | R22 = −130.44 | D22 = 0.266 | N12 = 1.51633 | ν12 = 64.1 |
| | R23 = −2.624 | D23 = 0.016 | | |
| | R24 = 1.591 | D24 = 0.446 | N13 = 1.72000 | ν13 = 50.2 |
| | R25 = −15.083 | D25 = 0.212 | | |
| | R26 = ∞ | D26 = 0.585 | N14 = 1.51633 | ν14 = 64.1 |
| | R27 = ∞ | | | |

| F | 1. | 2.39 | 5.52 |
|---|---|---|---|
| D5 | 0.108 | 1.722 | 2.360 |
| D10 | 2.625 | 1.011 | 0.373 |
| D11 | 0.168 | 1.077 | 0.168 |

-continued

| Numerical Example 3 |  |  |  |
|---|---|---|---|
| F = 1.00–5.52 | FNO = 1:1.25–1.75 | 2ω = 46.1°–8.8° | |
| D13 | 4.128 | 0.219 | 1.128 |

$$f1 = 4.771$$
$$f2 = -1.170$$
$$f3 = 4.558$$
$$f4 = 2.337$$

$$\frac{l_S}{l_T} = 0.954$$

According to the present invention, by reducing the physical length of the entire lens system and the diameter of the first lens unit, a great reduction of the overall weight of the zoom lens is achieved when a high-range compact zoom lens is realized.

Also, in the invention, despite the maximum angular field is increased, the angle of incidence of the oblique pencil on the first lens unit in the wide angle position can be made relatively low. Therefore, it does not lead to increase the diameter of the first lens unit. Moreover, even the third and fourth lens units that lie behind the diaphragm are not caused to increase their effective diameters unduly largely. A valuable increase in the maximum angular field can be easily achieved without producing any adverse effect on the advance in compactness the present invention has achieved.

Also, the position of each of the lens units becomes less responsive to the optical performance. Therefore, the assembling operation is easy to perform. Further, the telephoto setting of narrower angular field is usually often used in outdoor photographic situations. If the minimum possible f-number in the telephoto position is limited to so small a value as to give no trouble in actual practice, therefore, the diameter of the first lens unit can be controlled in the prescribed balance of the bulk and size of the zoom lens.

What is claimed is:

1. A zoom lens comprising, from front to rear, first, second, third and fourth lens units,
    said first lens unit having a positive refractive power and movable for focusing;
    said second lens unit having a negative refractive power and linearly movable along an optical axis for zooming;
    said third lens unit having a positive refractive power and axially movable for zooming, said movement being performed in such a way that, when zooming is effected from the wide-angle end, said third lens unit first advances toward the rear and then returns toward the front;
    said fourth lens unit having a positive refractive power for imaging; and
    a diaphragm fixedly positioned between said second and said third lens units.

2. A zoom lens according to claim 1, satisfying the following condition:

$0.75 < l_s/l_t < 0.98$ where $l_s$ and $l_t$ are the axial separations between said first lens unit and said diaphragm and between said first lens unit and said third lens unit respectively when set at the one end of the zooming range in a focused state at infinity.

3. A zoom lens according to claim 2, wherein the on-axial light rays leaving said third lens unit are substantially parallel to the optical axis.

4. A zoom lens according to claim 2, wherein said third lens unit consists of a bi-convex singlet lens.

5. A zoom lens according to claim 2, wherein said third lens unit consists of a bi-convex doublet.

6. A zoom lens according to claim 2, wherein said fourth lens unit comprises a front sub-unit including positive, negative and positive lenses and a rear sub-unit including negative and positive lenses.

7. A zoom lens according to claim 2, wherein said fourth lens unit comprises a front sub-unit including positive, negative and positive lenses and a rear sub-unit including negative, positive and positive lenses.

8. A zoom lens capable of providing a zoom range within a wide angle end and a telephoto end, said zoom lens comprising, from front to rear, first, second, third and fourth lens units,
    said first lens unit having a positive refractive power and movable for focusing;
    said second lens unit having a negative refractive power and linearly movable along an optical axis for zooming;
    said third lens unit having a positive refractive power and axially movable for zooming, said movement being performed in such a way that, when zooming is effected from the wide angle end of the range to the telephoto end, said third lens unit first advances toward the rear and then returns toward the front;
    said fourth lens unit having a positive refractive power for imaging; and
    a diaphragm fixedly positioned between said second and said third lens units;
    wherein axial separations within said zoom lens satisfy the following condition:

$0.75 < l_s/l_t < 0.98$ where $l_s$ and $l_t$ are the axial separations between said first lens unit and said diaphragm and between said first lens unit and said third lens unit, respectively, when set at the telephoto end of the zooming range in a focused state at infinity.

9. A zoom lens according to claim 8, wherein the on-axial light rays leaving said third lens unit are substantially parallel to the optical axis.

10. A zoom lens according to claim 8, wherein said third lens unit consists of a bi-convex singlet lens.

11. A zoom lens according to claim 8, wherein said third lens unit consists of a bi-convex doublet.

12. A zoom lens according to claim 8, wherein said fourth lens unit comprises a front sub-unit including positive, negative and positive lens and a rear sub-unit including negative and positive lenses.

13. A zoom lens according to claim 8, wherein said fourth lens unit comprises a front sub-unit including positive, negative and positive lenses and a rear sub-unit including negative, positive and positive lenses.

* * * * *

UNITED STATES PATENT AND TRADEMARK OFFICE
CERTIFICATE OF CORRECTION

PATENT NO. : 4,854,681
DATED : August 8, 1989
INVENTOR(S) : Masatake Kato, et al.

It is certified that error appears in the above-identified patent and that said Letters Patent is hereby corrected as shown below:

On the title page, Item [75] Inventors

"Masatake Kato; Sadahiko Tsuji; Muneharu Sugiura; Kazuo Tanaka, all of Tokyo, Japan" should read --Masatake Kato, of Tokyo; Sadahiko Tsuji, of Yokohama; Muneharu Sugiura, of Tokyo; Kazuo Tanaka, of Tokyo; all of Japan--.

COLUMN 1:

Line 63, "of," should read --of--.

COLUMN 2:

Line 68, "o" should read --of--.

COLUMN 4:

Line 68, "action to enter" should read --action enter--.

UNITED STATES PATENT AND TRADEMARK OFFICE
CERTIFICATE OF CORRECTION

PATENT NO. : 4,854,681

DATED : August 8, 1989

INVENTOR(S) : Masatake Kato, et al.

It is certified that error appears in the above-identified patent and that said Letters Patent is hereby corrected as shown below:

COLUMN 7:

Numerical Example 2, $$\text{"III} \begin{bmatrix} R12" \\ R13 \end{bmatrix}$$

$$\text{IV} \begin{bmatrix} R14 \\ R15 \\ R16 \\ R17 \\ R18 \\ R19 \\ R20 \\ R21 \\ R22 \\ R23 \\ R24 \\ R25 \\ R26 \end{bmatrix}$$

should read $$\begin{bmatrix} R12 \\ R13 \\ R14 \end{bmatrix}$$

$$\text{IV} \begin{bmatrix} R15 \\ R16 \\ R17 \\ R18 \\ R19 \\ R20 \\ R21 \\ R22 \\ R23 \\ R24 \\ R25 \\ R26 \end{bmatrix}$$

UNITED STATES PATENT AND TRADEMARK OFFICE
CERTIFICATE OF CORRECTION

PATENT NO. : 4,854,681

DATED : August 8, 1989

INVENTOR(S) : Masatake Kato, et al

It is certified that error appears in the above-identified patent and that said Letters Patent is hereby corrected as shown below:

COLUMN 9

Line 63, "the one" should read --one--.

Signed and Sealed this

Nineteenth Day of November, 1991

Attest:

HARRY F. MANBECK, JR.

*Attesting Officer*     *Commissioner of Patents and Trademarks*